US006570674B2

(12) United States Patent
Pleotis (10) Patent No.: US 6,570,674 B2
(45) Date of Patent: *May 27, 2003

(54) LICENSE PLATE FRAME AND METHOD AND APPARATUS FOR MAKING THE SAME

(76) Inventor: Elia M. Pleotis, 1608 W. Ethans Glen Dr., Palatine, IL (US) 60067

( * ) Notice: Subject to any disclaimer, the term of this patent is extended or adjusted under 35 U.S.C. 154(b) by 13 days.

This patent is subject to a terminal disclaimer.

(21) Appl. No.: 09/907,518

(22) Filed: Jul. 17, 2001

(65) Prior Publication Data

US 2002/0030829 A1 Mar. 14, 2002

Related U.S. Application Data

(63) Continuation of application No. 08/907,860, filed on Aug. 8, 1997, now Pat. No. 6,262,807.

(51) Int. Cl.[7] .......................... G06K 15/00; G06F 3/00; G09F 7/00; G09F 7/16
(52) U.S. Cl. ..................... 358/1.2; 358/1.18; 400/209
(58) Field of Search ................ 358/3.29, 3.31, 358/1.18, 1.2; 40/209

(56) References Cited

U.S. PATENT DOCUMENTS

| 4,052,739 A | 10/1977 | Wada et al. |
| 4,799,172 A | 1/1989 | Wood et al. |
| 4,924,611 A | 5/1990 | Shaw ................... 40/210 |
| 4,980,706 A | 12/1990 | Someya |

Primary Examiner—Scott Rogers
(74) Attorney, Agent, or Firm—Marshall, Gerstein & Borun (57) ABSTRACT

A method and apparatus for making a custom decorative license plate frame from a blank having a base member and a lamination of a contrasting color. The blank is aligned to a reference and message zones are defined relative to the reference. Data representing text and/or graphics to be transferred to the frame are input by a user and a data processor scales the data to the message zones. Transfer data is generated from the scaled message data and the message is transferred to the frame using a transfer tool and the transfer data.

14 Claims, 6 Drawing Sheets

LICENSE PLATE FRAME AND METHOD AND APPARATUS FOR MAKING THE SAME

This is a Continuation of U.S. application Ser. No. 08/907,860, filed Aug. 8, 1997 now U.S. Pat. No. 6,262,807.

FIELD OF THE INVENTION

The present invention relates generally to decorative license plate frames, and more particularly, to an custom decorative license plate frame and a method and apparatus for making the same.

BACKGROUND OF THE INVENTION

Decorative license plate frames are popular among motorists who like to add a personal touch to their vehicle. They are also a very popular and inexpensive form of advertisement. For example, vehicle dealers and repair shops often provide license plate frames to their customers listing the facility name and telephone number. But the application isn't limited to vehicle related advertisers as any business may benefit from displaying its name, telephone number, web address, or other information on business and personal vehicles alike. Still others, not wanting to potentially damage the finish of their vehicle using a bumper sticker, use their license plate frames for sending messages or making a personal or political statement.

Most decorative license plate frames available on the market today have a monochromatic molded frame blank onto which text and graphics are molded or screen printed. In this regard, specialized molds or printing screens are created and utilized to print images and text onto the blank. This process proves to be beneficial where a large number of identical frames are desired. This may be the case, for example, for a car dealer who wishes to have a custom frame placed on each vehicle it sells or services and therefore requires a large number of identical frames. However, this process requires the creation of a custom made and specialized mold or printing screen making it impractical for making low quantity, custom decorated license plate frames.

Another process for making decorative license plate frames uses a blank monochromatic frame onto which either printed or engraved inserts are bonded. This process offers the advantage that the inserts may be custom printed or engraved allowing a degree of flexibility in design in the final frame design. Use of inserts may offer some flexibility for creating unique frames, however, the process is hampered by the required bonding process. Moreover, with time the adhesive may fail allowing the insert to dislocate from the frame.

As uniquely as individuals want their vehicles to be in design, they want to be able to display messages and images/graphics, advertise or simply further decorate and distinguish their vehicles. While offering great potential to satisfy this need for motorists, decorative license plate frames remain hampered in that they are not readily or easily customized. Therefore, there remains a need for a unitary custom decorative license plate frame and a method and apparatus for making the same.

SUMMARY OF THE INVENTION

The present invention provides a license plate frame which may be custom designed and decorated to an individuals unique specification. The license plate frame is a laminate having a molded base of a first color and a lamination of a contrasting color. Engraving areas are mapped onto the frame and engraving data is scaled to fit the engraving areas. The engraving data represents custom messages, designs and/or graphics for each particular and uniquely created frame. The engraving data is translated to cutting data for driving an engraving machine. The frame is engraved using the cutting data so that the base color is exposed through the lamination revealing the custom message.

The present invention also provides a method of making a custom decorated license plate frame. A graphic user interface is used to input user defined text messages and graphic designs. The data is scaled and mapped to engraving areas defined on a license plate frame blank frame. The scaled data is then translated into cutting data. The blank license plate frame, having a base color and a contrasting lamination, is secured to an engraving tool. The cutting data is used to drive the engraving tool to engrave the custom message/design into the license plate frame. The engraving process exposes the base color under the lamination, and hence, the message/design in the frame.

Still other features and advantages of the present invention will be readily appreciated by those skilled in the art from the following detailed description of the preferred embodiments and the attached drawings.

DETAILED DESCRIPTION OF THE PREFERRED EMBODIMENTS

The present invention provides a custom decorative license plate frame and a method and apparatus for making these frames. The invention is described in terms of preferred embodiments for making automobile license plate frames, and particularly, an apparatus and method for custom engraving license plate frames. It should be understood from the outset that the invention has application far beyond the exemplary embodiments presented and described herein, and as such is not to be limited to those embodiments. For example, while described in terms of creating engraved automobile license plate frames the invention has equal applicability for creating motorcycle license plate frames. In addition, the invention is not limited to the particularly physical configuration of license plate frame, but instead is adaptable to any license plate frame configuration such as where the custom decoration is ink jet printed onto the frame.

Figure 1:
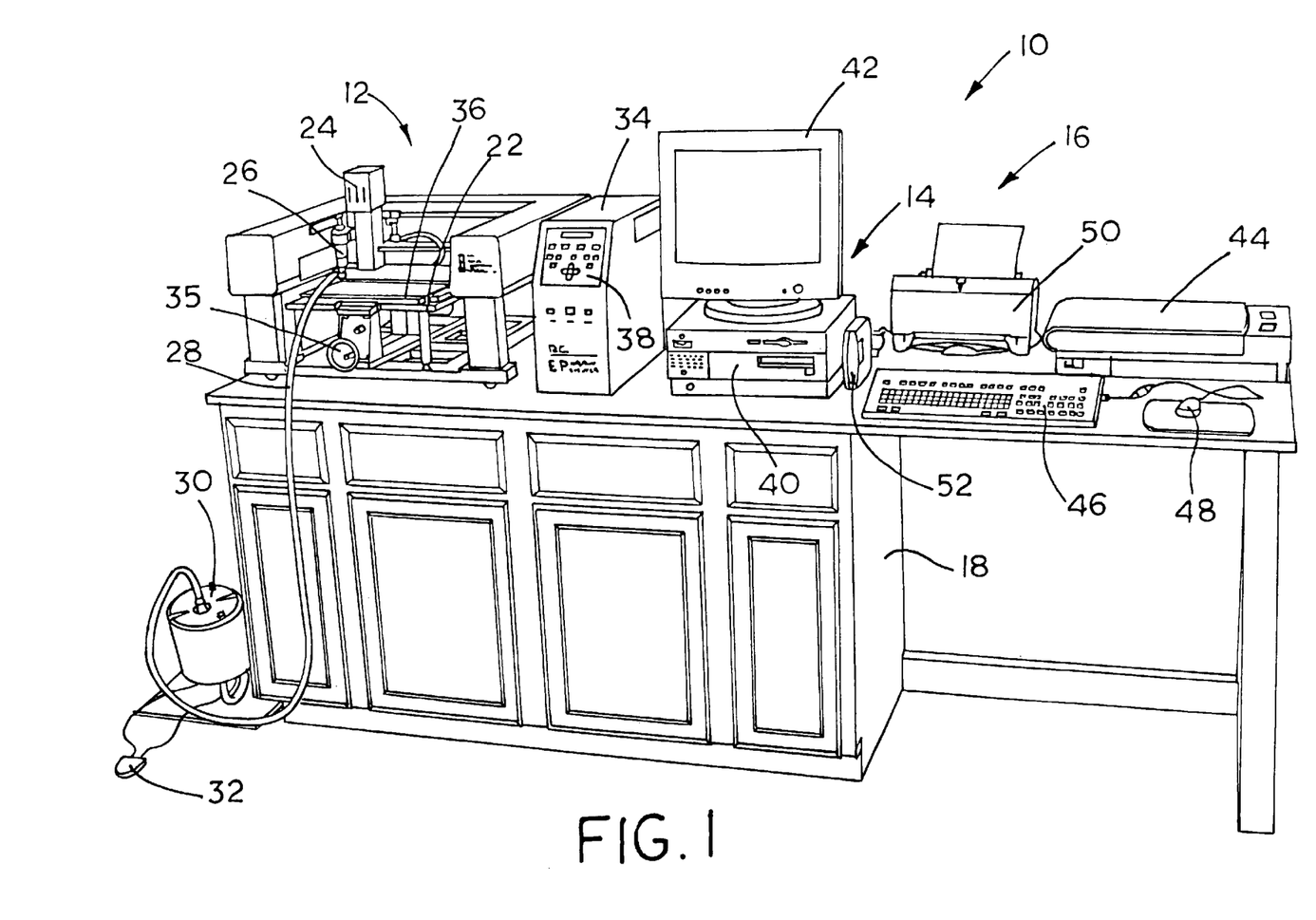
FIG. 1 is a perspective view of an apparatus for making a license plate frame in accordance with a preferred embodiment of the present invention.
Figure 2:
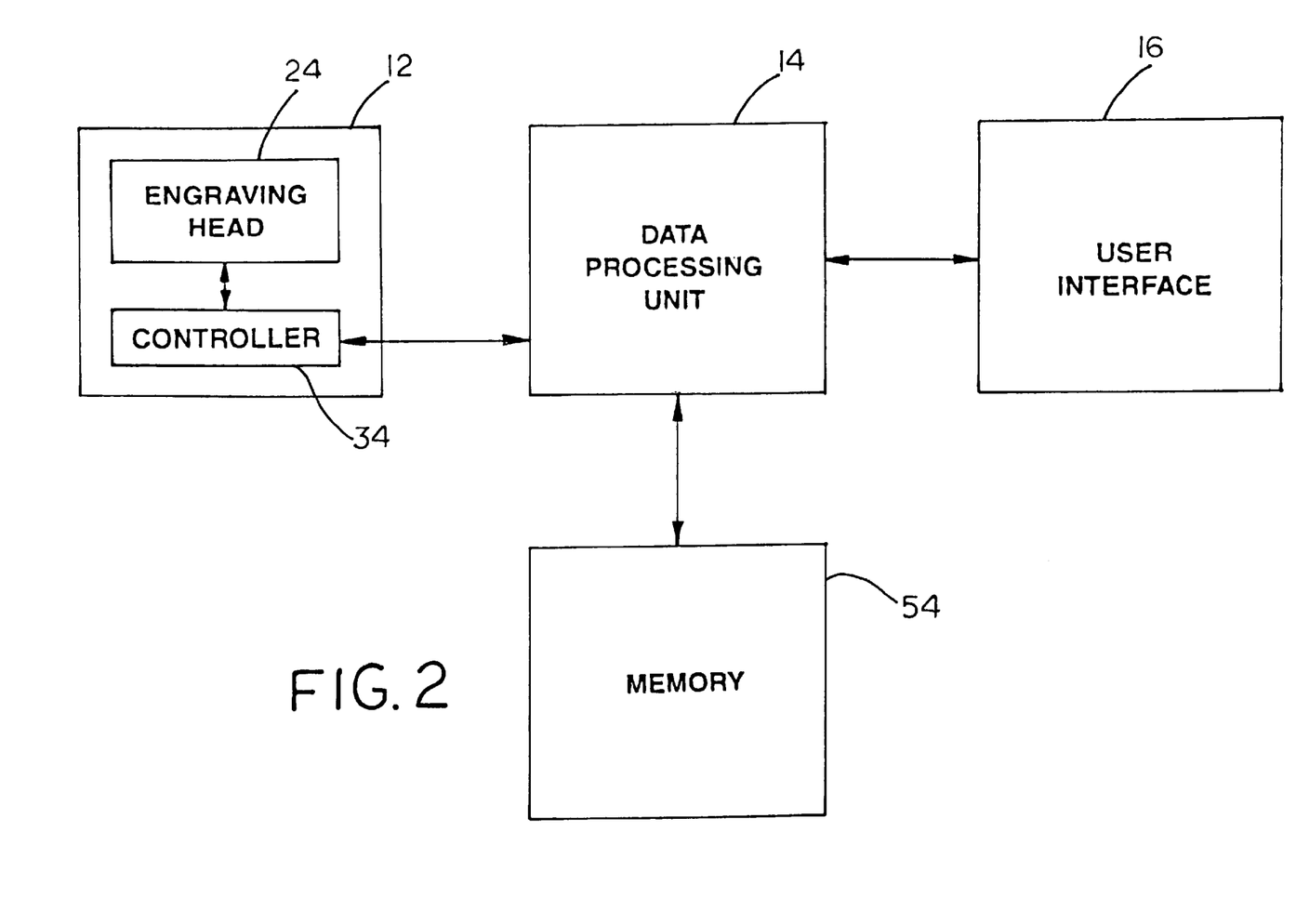
FIG. 2 is schematic representation of an apparatus for making a license plate frame in accordance with a preferred embodiment of the present invention.

With reference then to FIG. 1, a system 10 for making decorative license plate frames is suitably secured to a workbench/table 18 and includes an engraving unit 12 and a data processing unit 14 having a user interface (16 in FIG. 2). In the preferred embodiment engraving unit 12 is a New Hermes model no. 3400. Engraving unit 12 includes a cutting bed 22 above which a cutting head 24 articulates in three axes and in accordance with standard operation of the unit. Cutting head 24 includes spindle 26 into which a cutting tool (not shown) is secured for performing the engraving function. Further coupled to spindle 26 is a waste tube 28 which in turn is coupled to a vacuum unit 30 having foot control 32 for collecting cutting debris. One will appreciate that the utilization of other forms of automated engraving is possible without departing from the fair scope of the invention. For example, a laser engraving unit may be employed. The laser engraving offers a number of advantages in terms of precision and engraved quality. In an alternate embodiment cutting head 24 may be replaced with an ink jet print unit having multi-color capability. In this manner the unit can custom print messages and images/graphics onto a monochromatic frame.

Engraving unit 12 further includes a unit controller 34 which is coupled to data processing unit 14 for receiving cutting data and is coupled to cutting head 24 for controlling the engraving operation. Engraving unit 12 further includes manual cutting head controls 38 for use as necessary during initial set up and calibration.

Figures 6, 8:
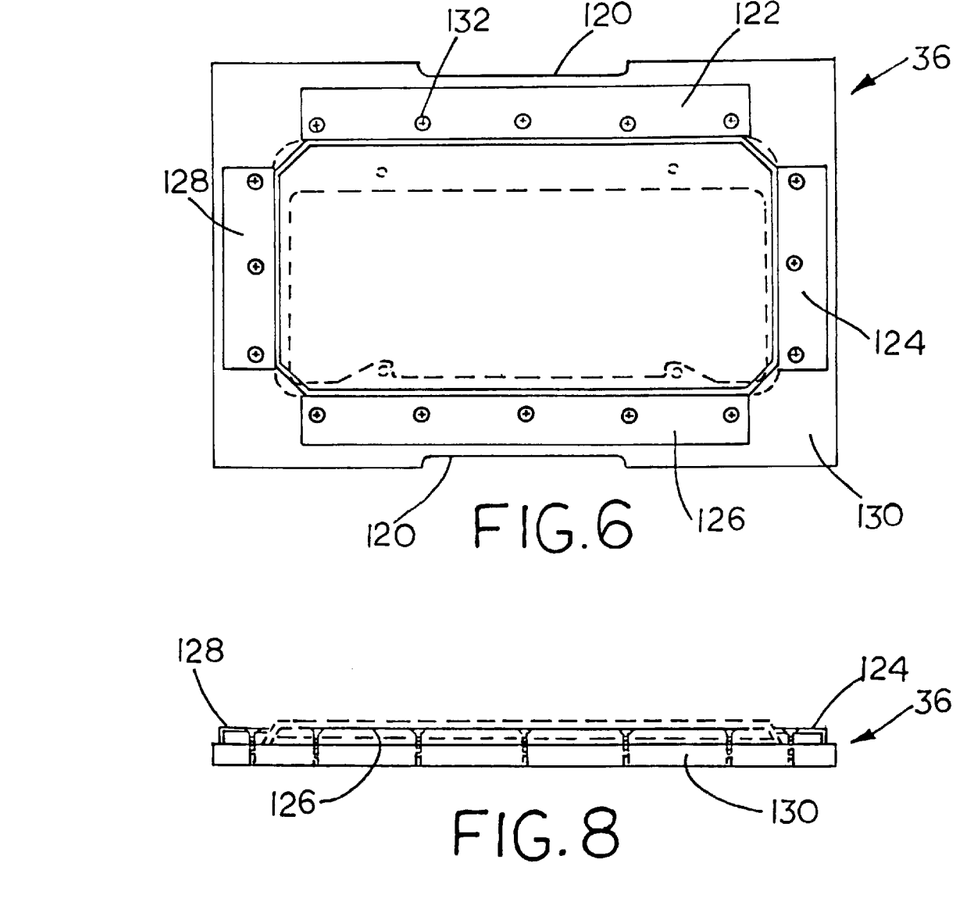
FIG. 6 is a plan view of license plate frame holding jig in accordance with a preferred embodiment of the present invention.
FIG. 8 is a front view of the jig shown in FIG. 6.
Figure 7:
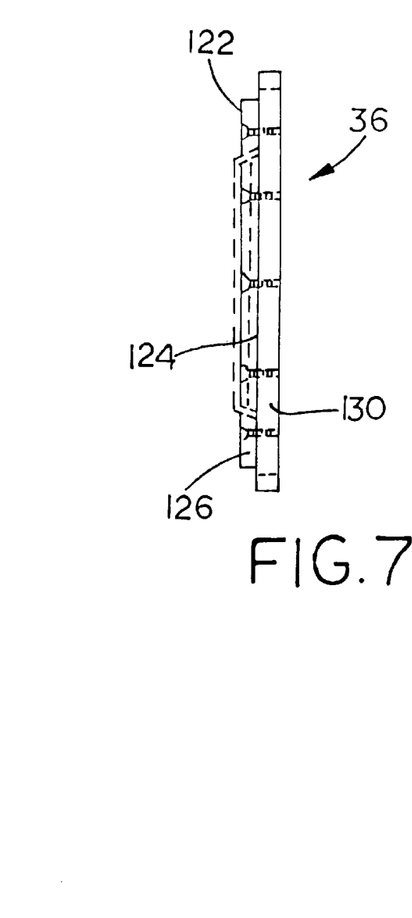
FIG. 7 is a side view of the jig shown in FIG. 6.
Figure 9:
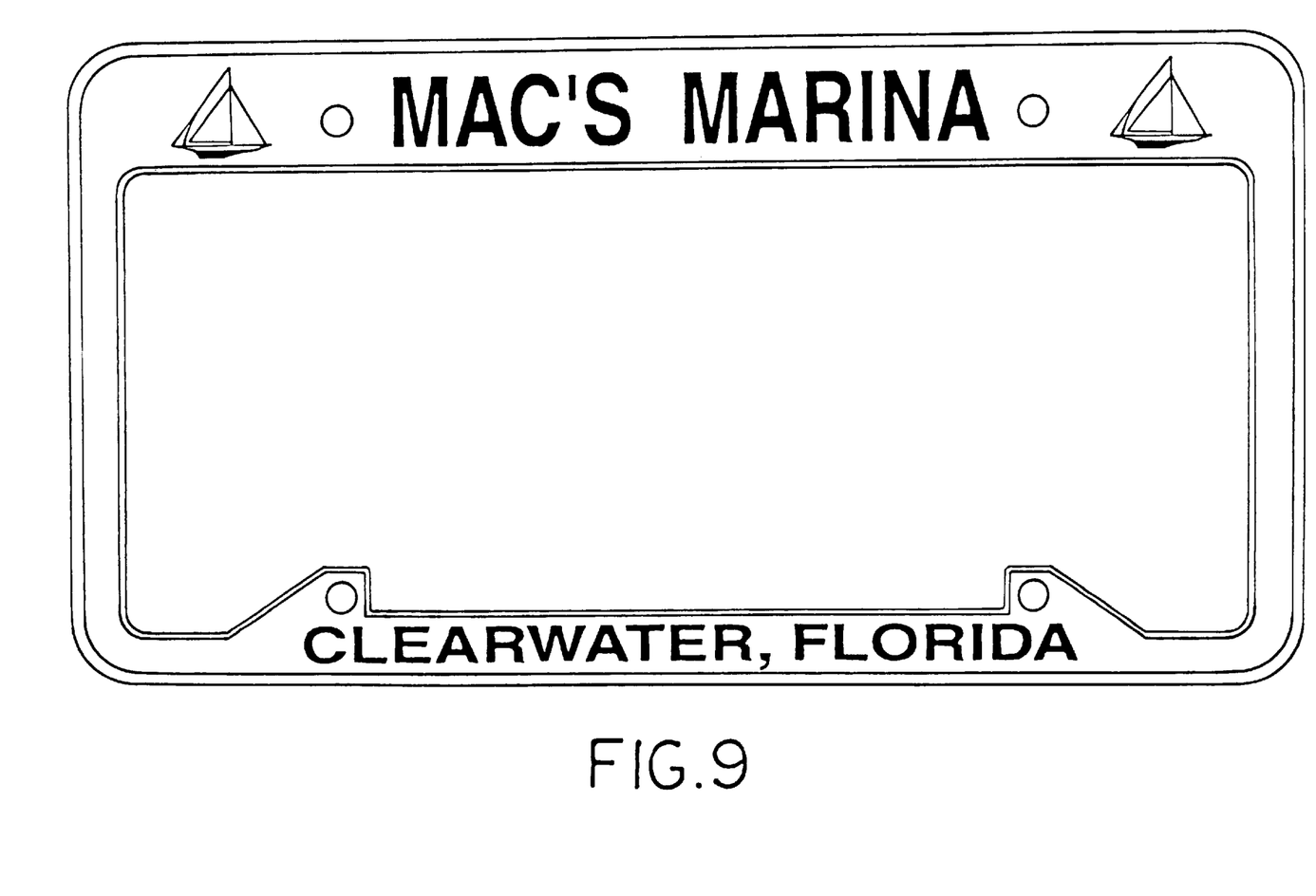
FIG. 9 is a front view of a completed frame in accordance with a preferred embodiment of the present invention.

Adapted to engraving unit 12 is a license plate frame holding jig 36 (FIGS. 6 and 7). Jig 36 is adapted to be secured to the engraving unit 12 using a holding vice member (not shown) which engage flats portions 100 through actuation of clamping wheel 35. Jig 36 further includes holding members 102–108 which engage the sides of a frame (shown in phantom) for securely retaining the frame to the cutting unit during the engaging process. Holding members 102–108 are retained to a base member 110 with a plurality of screws 112 which pass through apertures (not shown) formed in holding members 102–108 and threadingly engage the base portions. The apertures are offset such the tightening of screws 112 tends to drive holding members 102–108 inwardly and into engagement with the frame. It should be understood that other suitable clamping means, such as over center clamping or the like, may be employed with departing from the fair scope of the invention.

Data processing 14 unit is preferably any personal computer having sufficient processing speed and memory. In the preferred embodiment a Macintosh model 7200 is utilized for its graphics processing capabilities. Also preferable is to integrate user interface 16 with data processing unit 14 as is the case using the Macintosh personal computer. In that regard, data processing unit includes processor 40, monitor 42, scanner 44, keyboard 46, mouse 48, printer 50 and external storage disk drive 52. Each of these devices may be any commercially available type device. In the preferred implementation monitor 42, keyboard 46 and mouse 48 are the standard devices sold together with the Macintosh computer. Scanner 44 is a Apple model Color One Scanner, printer 50 is a Apple model StyleWriter II, and external storage disk drive 52 is an Epson model Zip Drive.

One will readily appreciate, however, that a stand alone dedicated processing unit/user interface may be employed which would not deviate from the fair scope of the present invention. That is, a dedicated processing platform with interactive user capabilities may be implemented. Such a unit would offer processing speed advantages and may be further custom adapted to allow use of the engraving unit by a novice. A dedicated processing unit and interface would thereby allow for stand alone systems which may be located, for example, at car washes, service centers, arcades and the like and operated by the license plate frame customer. The customer, following instructions provided via the user interface, creates their own custom designed license plate frame. The system then functions to engrave and deliver the unit to the customer. As will be appreciated, the system could be further adapted to accept currency, credit cards, debit cards, tokens and/or access codes for collecting for the license plate frames sold. The user interface could easily include a card reader for receiving credit/debit card data, a currency scanner or could accept via keypad entry authorized access codes. The access codes would be purchased from an attendant and entered by the user to enable the system.

Data processing unit 14 includes memory 54 and operates a commercially available graphics processing software package stored therein. The preferred graphics processing software package is Adobe Illustrator version 6.0, however, it is well understood that any suitable graphics processing software package may be employed. Adobe Illustrator is chosen for its ease of use and compatibility with operating software provided with and operated upon by engraving unit controller 34 as will be explained in greater detail hereinlater. In accordance with a stand-alone system, custom software may be generated and implemented again without departing from the fair scope of the invention.

Figure 3:
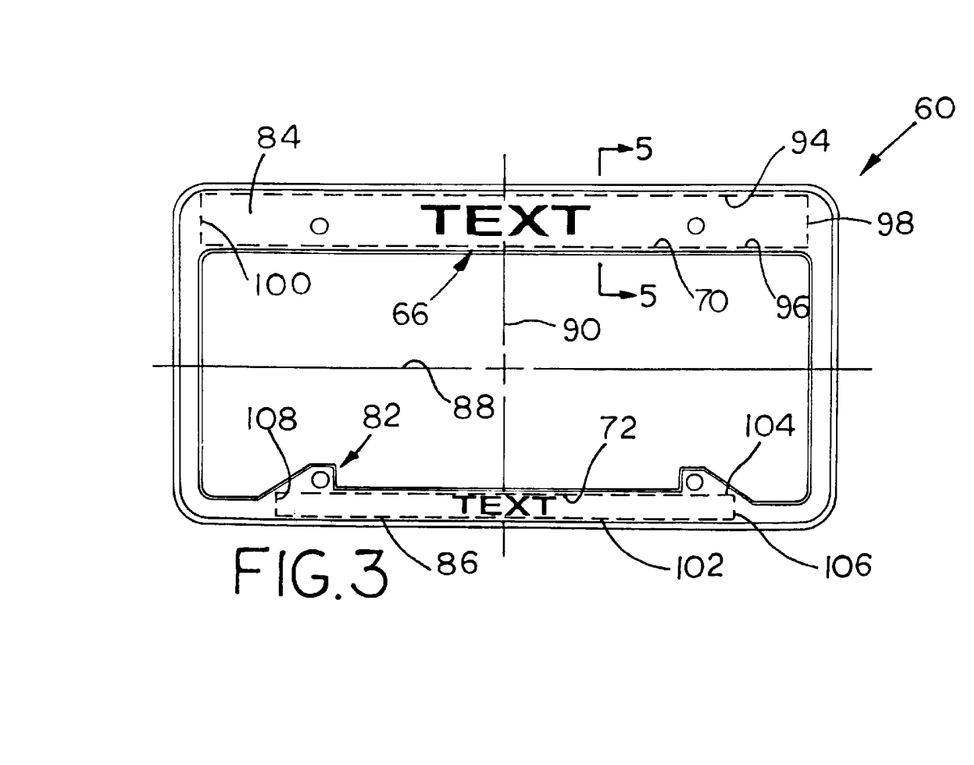
FIG. 3 is a front view of license plate frame in accordance with a preferred embodiment of the present invention.
Figures 3A, 5:
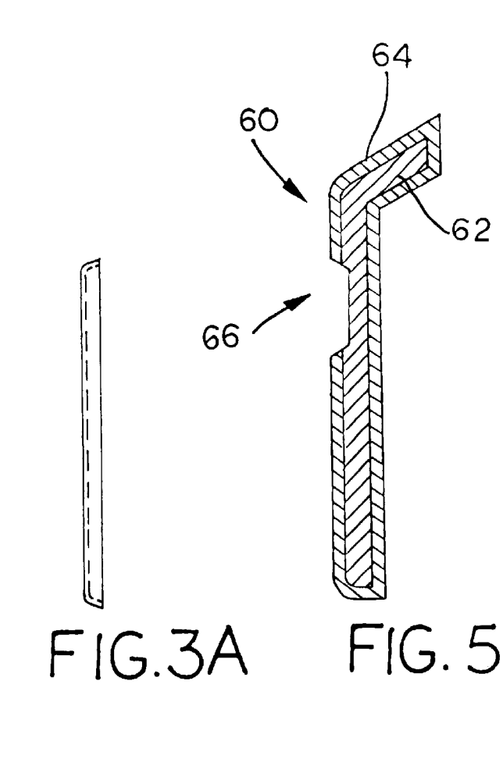
FIG. 3a is a side view of the license plate frame shown in FIG. 3.
FIG. 5 is a sectional view of the license plate frame in accordance with a preferred embodiment of the present invention.
Figure 4:
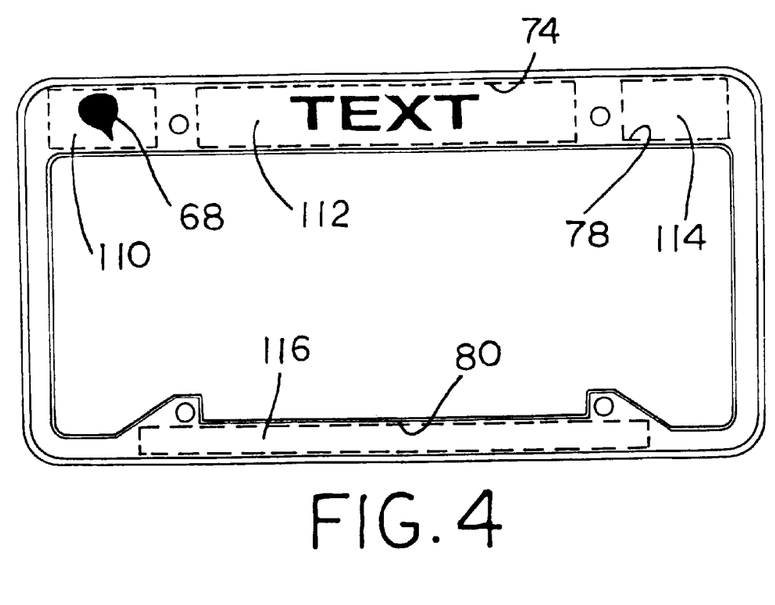
FIG. 4 is a front view of a license plate frame in accordance with another preferred embodiment of the present invention.
Figure 4A:
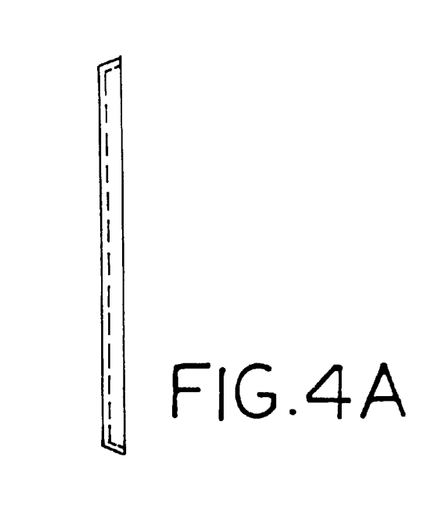
FIG. 4a is a side view of the license plate frame shown in FIG. 4.

With reference then to FIGS. 3–5, a license plate frame 60 in accordance with the present invention is shown. Frame 60 preferably has a base member 62 formed as a monolithique molded frame of the appropriate shape and size. A lamination 64 (best seen in FIG. 5) is applied over base member 62. In the preferred embodiment, lamination 64 is a layer of paint applied over base member 62. When engraved, lamination 64 is selectively removed and a portion of base member 62 is exposed to reveal the design. To add depth and enhance contrast a small portion of base member 62 may also be removed by the engraving tool. As shown in FIG. 3, the design may be alpha/numeric textual information 66. Still, the design may be a graphical design 68 as illustrated in FIG. 4. Frame 60 further includes suitable mounting tab areas 82 for securing frame 60 to the license plate mount of a motor vehicle.

It will be appreciated that several layers of lamination 64 may be applied to the frame 60. In this regard, selective removal of various layers of lamination 64 can provide multi-color multi-faceted designs. Further, it is possible to provide a frame with a preprinted portion in accordance with know printing techniques. These pre-printed frames may then be custom engraved providing a hybrid, distinctive, custom frame design. As noted above in a preferred embodiment, lamination 64 is formed by applying a substantially uniform layer of paint over a monolithique molded plastic frame. In alternative preferred embodiments lamination 64 may be metalized plating a layer or layers of films adhered over a frame base member. Films offer a number of processing advantages and may be made of varying colors and thicknesses. Engraving of the frame, either by mechanical cutting or lasing, selectively removes portions of the metalized plating and/or films to reveal the custom message and/or images/graphics. Other suitable methods of creating laminations over a base member may be employed without departing from the fair scope of the invention.

Template data providing dimensions and other mathematical details of typical license plate frames, such as frame 60, are generated and stored within memory 54. It is possible to scan, using scanner 44 and its associated operating software, a typical frame and save the data as a file for later use. Alternatively, data representing frame 60 may be created within data processor 14 using, for example, the Adobe Illustrator product. While the engraving tool does not utilize the frame data during operation, the frame data assists the user in scaling and positioning text and graphics.

With reference once again to FIGS. 3 and 4, a difficulty with creating custom engraved frames relates to aligning the text message and/or graphic design to the frame. Small offsets in the layout create large visual offsets in the finished product. In accordance with a preferred embodiment of the present invention, the license plate frame is divided into a number of engraving zones (84 and 86 in FIG. 3; 110, 112, 114 and 116 in FIG. 4) which are defined relative to the frame data. The engraving zones are offset relative to a number of horizontal and vertical references including plate center lines 88 and 90, respectively. More importantly, a plurality of print guides defined by horizontal and vertical references define the engraving zones relative to the frame itself. As shown, engraving zone 84 is defined by horizontal references 94 and 96 and by vertical references 98 and 100. Engraving zones 110–116 are similarly defined by horizontal and vertical references, not shown. The data defining the engraving zones is stored within memory 54 in association with the frame data and is recalled in accordance with the graphics software package procedures when a user desires to create a custom license plate frame 60. As will be described, during operation, the engraving zones are utilized to assist in scaling and positioning text messages and graphic designs.

To make a license plate frame, a frame blank having an appropriate base member 62 color and lamination 64 color is selected and secured to holding fixture 36. The engraving tool is then calibrated. For the chosen engraving tool 12 X and Y axis calibration is automated. The Z axis calibration is completed by zeroing the cutter micrometer and moving the spindle over and into contact with a surface to be engraved using the manual controls 38. The cutting tool is then adjusted into contact with the surface and locked into position. Finally, the cutting depth is set and the engraving tool is ready for operation.

Next the software package is launched and the appropriate files containing the frame data and print guide/engraving zone data are retrieved. Using user interface 16, a user inputs a text message, graphics, scanned images or other engraving data using the text/graphics commands of the software package. Next using the scaling and positioning capabilities of the package (for example, drag and drop and/or drag to size), the engraving data is positioned within the engraving zones and scaled to the desired size. It should be noted that the engraving data may be centered, offset and sized up to the size of the engraving zone.

Next the engraving data, including text and/or graphics and in a "rasterized data" format, is operated upon to create vector outline cutting data for operating engraving unit 12. The engraving data is converted to, using the commercially available Adobe Streamline software package, and saved as vector outline data within memory 54. This is a feature of the engraving unit 12 which recognizes outline data. The engraving data is saved independent of the frame data, which is used as a reference, and is not required for actual engraving of the frame. Next, software associated with the engraving unit is launched and the saved "outline" data is retrieved. The print guides, which are saved with the engraving data, are removed. This leaves only the engraving data previously defined. The engraving data is in the form of outline data which may be filled prior to engraving. A fill feature of the software is utilized to fill the outline data making the engraving data solid. It should be understood that the data may be left in outline form in which case the final engraved frame is in an outline form. It is important to note that prior to filling the engraving data, the cutting path is verified using a path command of the engraving unit software. It is important to ensure the path is on the inside of the outline data. With the cutting path properly defined and the outline data filed a plot file containing the now defined cutting data is saved. Cutting parameters, such as cutter speed, cutting depth, lift depth, and dwell time are set and the plot is sent to the engraving unit which operates in accordance with its specifications to create a custom decorative license plate frame.

The present invention has been described in terms of a number of preferred embodiments. It is understood by those of ordinary skill in the art that numerous adaptations of the present invention may be made without departing from its fair scope. For example, a dedicated unit may be constructed integrating the data processing, user interface and cutting controller into a single dedicated processing device. Moreover, the unit may be constructed as a standalone user operated device such as at a car wash, service station or arcade. The presently preferred implementation is provided solely to illustrate the invention and its many features. The inventions fair scope shall be judged only by the scope of the subjoined claims.

I claim:

1. A method of making a license plate frame comprising the steps of:

providing a license plate frame having a base member;

aligning the license plate frame to a reference;

defining on the license plate frame at least one message zone;

providing message data;

scaling the message data relative to the message zone;

generating transfer data from the scaled message data;

transferring the message data to the license plate frame by selectively masking portions of the base member in accordance with the transfer data.

2. The method of claim 1 wherein the step of providing message data comprises:

providing a graphic user interface;

accepting user data via the graphic user interface;

generating the message data from the user data.

3. The method of claim 1 further comprising the step of calibrating a transfer tool to the aligned license plate frame.

4. The method of claim 1 wherein the step of defining on the license plate frame at least one message zone comprises the steps of:

defining a plurality of print guides relative to a master datum associated with a transfer tool and to the license plate frame; and defining the message zone relative to the print guides.

5. The method of claim 4 wherein the step of defining a plurality of print guides comprises establishing a plurality of horizontal and vertical references.

6. The method of claim 4 wherein the step of scaling the message data to the message zone comprises the step of scaling the message data relative to the print guides.

7. The method of claim 4 further comprising the steps of:
   providing a graphic user interface; and
   using the graphic user interface to provide a visual image of the message data relative to the message zone prior to engraving.

8. The method of claim 1 wherein the message data comprises at least oone of text data, graphics data, scanned data and image data.

9. An apparatus for forming a license plate frame comprising:
   means for aligning the license plate frame to an engraving table portion of an engraving tool;
   means for defining on the license plate frame at least one engraving zone;
   means for providing engraving data;
   means for scaling the engraving data relative to the engraving zone;
   means for generating cutting data from the scaled engraving data;
   means for engraving the license plate frame using the engraving tool and the cutting data.

10. The apparatus of claim 9 wherein the means for providing engraving data comprises a graphic user interface.

11. The apparatus of claim 9 further comprising:
   means for defining a plurality of print guides relative to a master datum associated with the engraving tool and to the license plate frame; and
   means for defining the engraving zone relative to the print guides.

12. The apparatus of claim 10 wherein the plurality of print guides comprise a plurality of horizontal and vertical references.

13. The apparatus of claim 12 wherein the means for scaling the engraving data to the engraving zone is operable to scale the engraving data relative to the print guides.

14. The apparatus of claim 12 further comprising:
   a graphic user interface operable for providing a visual image of the engraving data relative to the engraving zone prior to engraving.

* * * * *